United States Patent Office 3,467,531
Patented Sept. 16, 1969

3,467,531
STERILISATION OF MILK PRODUCTS
Arthur Bratland, Rosenberggaten 34,
Bergen, Norway
No Drawing. Filed Jan. 27, 1966, Ser. No. 528,024
Int. Cl. A23c 3/02, 9/00
U.S. Cl. 99—212                              7 Claims

ABSTRACT OF THE DISCLOSURE

A sterilised milk or cream is obtained which can be stored for long periods of time without a "boiled" taste. Either buttermilk or the low fat milk fraction obtained by separating cream into a fat enriched fraction and a low fat milk fraction is added to milk or cream and the mixture is then sterilised.

---

This invention relates to milk products, and in particular to processes for treating such products for improving their storage qualities, and to products obtained by such processes.

More particularly, the invention relates to the sterilisation of milk and cream for obtaining products that may be stored for a considerable time without deterioration and without developing any unpleasant taste or flavour.

When improving the storage qualities of nutrients containing proteins and sugars, sterilisation is the conventional process. Such sterilisation is conventionally carried out by a heat treatment for reducing the bacteria content as much as possible, preferably down to nil. However, when treating milk and milk products such as cream, an ordinary heat treatment for sterilisation will lead to the development of an unpleasant taste and flavour known as the taste of boiled milk. The reaction mechanism involved herein is not known in details, although several explanations of this phenomenon have been advanced in the past. However, it is obvious that an exact explanation cannot be easily given, since the amount of flavourants naturally will be very small.

Many attempts have been made in the past to obtain milk and milk products in which the bacteria content has been decreased as much as possible in order to increase the storage qualities while avoiding this unpleasant taste. The pasteurisation process is the most commonly known and used. Other processes involve the use of high temperatures in fractional seconds, taking advantage of the fact that the reaction velocity of the sterilisation process is higher than the velocity of the reaction or reactions leading to the development of a "boiled" taste.

In addition to the above mentioned effect upon the taste, the heat treatment also has an effect upon the colour of the milk or milk product. This is most significant in cream, where a darkening or yellowing of a heated cream is readily observed. Another detrimental effect upon cream may be that its whippability may be adversely affected and may even be entirely lost in many cases.

There is a high demand for cream having a better storage quality than may be obtained by the conventional methods such as pasteurisation and similar milk treatments. This demand had led to the marketing of sterilised cream products which have been subjected to such severe heat treatment that a "boiled" taste is readily observed in the product. Naturally, these products cannot be used where the taste of the product as such is of importance, but they are extensively used for special purposes such as coffee cream, pastry and the like. Normally, these products are not whippable as such.

It is an object of the present invention to obtain a milk product which is able to withstand the severe conditions in sterilising processes with only slight devleopment of any undesired "boiled" taste.

Another object of the present invention is to obtain a milk product in which the colour changes referred to above has been considerably reduced.

Still another object of the present invention is to obtain a milk product, particularly cream, which is readily whippable even after having been subjected to a sterilisation process.

According to the present invention, a sterilised milk product comprises fat and a low fat milk fraction, said low fat milk fraction containing a low fat milk fraction obtained from genuine milk cream containing at least 10 percent by weight of butterfat by removing the latter, and said low fat milk fraction having been subjected to a sterilisation process for reducing the bacteria content therein and for improving its storage qualities.

The invention is based upon the surprising discovery that some special low fat milk fractions will contain certain constituents which, in some ways at present not known act to decelerate the development of any undesired and unpleasant taste in milk subjected to a sterilisation treatment. Generally, these constituents will follow the fat fraction when first dividing milk into a low fat fraction and a fat enriched fraction, but a substantial portion will remain in the low fat ("watery") fraction when further enriching the fat content.

The nature of said constituents is not exactly known, not even their general nature, but it is suggested that they may be related to the class of emulsifiers, since the concentration of fat in emulsion seems to have some correlation to their enrichment in either the watery phase or the fat (oil) phase. It is believed that the constituents may be or have some relation to the lecithin group of compounds, but this is based upon a mere assumption. Lecithin is known to be a quite weak emulsifying agent, but little or nothing is known about its other properties, such as its properties as a protecting agent.

According to an aspect of the invention a sterilized milk product having a pleasing taste after having been subjected to a severe sterilization is obtained by the low fat milk fraction containing a low fat fraction obtained by subjecting genuine milk cream of a fat content of at least 10 percent to a centrifugation to further divide the cream into a low fat and a high fat fraction. In a preferred embodiment, a milk cream containing at least 25% fat is first produced, whereupon said cream is centrifugated to a fat content of say 55% and the low fat fraction thus obtained used to dilute cream down to a lower fat content. Thereupon, this cream is subjected to sterilization.

According to another aspect of the present invention a sterilized milk product having a pleasing taste even after severe sterilization is obtained by diluting cream with buttermilk, to the desired fat content, whereupon this mixture is subjected to serilisation. Preferably, sweet buttermilk is used in this embodiment, although acid buttermilk may also be used in a neutralised or unneutralised state.

At present, a very important product obtained by the present invention is considered to be a sterilised cream having a fat content of 18–28 percent by weight. By the novel process according to the invention cream may be made with a storage life of at least several weeks when packed in sealed containers and stored under tropical conditions. This storage life will of course differ all according to the sterilisation treatment, but even when subjected to the most severe conditions the cream so treated will not have any unpleasant taste such as is experienced when treating ordinary cream in the same way.

The reaction mechanism causing this improvement of the taste and flavour of sterilised cream is not fully understood. Under certain conditions, a "boiled" taste may develop, but even then, this taste is far less significant than the taste developed in ordinary cream subjected to the same treatment. In most cases, the taste will disappear when making whipped cream.

In this connection it should be mentioned that a unique property of at least some of the types of cream thus obtained may be readily whippable even when the fat content of the cream is low.

In dairy practice, it is a generally accepted teaching that a genuine milk cream should contain at least 30 percent by weight in order to be readily whippable. This figure may differ all according to the origin of the milk from which the cream has been prepared. However, it has appeared that the same addition as used according to the present invention may give a cream which can readily be whipped even when the fat content of the cream is decreased below 20 percent by weight. Obviously, there is no real correlation between the whipping ability of a cream and the protection against the development of unpleasant taste and flavour by sterilisation treatment, since an ordinary cream will readily develop such unpleasant taste even when subjected to relatively mild conditions. On the other hand, there is a great demand for a cream which is, on one hand, readily whippable, and on the other hand may be sterilised to increase its storage life considerably, even up to several months.

Example 1

Whipping cream was separated having a content of 35 percent fat in the usual maner. This whipping cream (commercial quality) was diluted to a fat content of 20 percent with non-acidified buttermilk. A half portion of this 20 percent cream was heated to 100° C. in two minutes, whereupon a tasting panel consisting of 30 agricultural students were submitted both samples. None of the tested persons could distinguish any difference in flavour between the two samples worth mentioning; the result was possibly a little in favour of the boiled sample. After this it was pointed out that the one sample had been exposed to boiling, and there was made a test for judgement as to which sample this was. Here also the result was in favour of the boiled sample.

A commercial 20 percent cream was treated at 100° C. for two minutes in an exactly corresponding manner. Each and all of the tested persons picked out this sample as boiled.

The boiled sample was shown quite clearly to have superior properties of durability.

Example 2

Cream having a fat content of 35 percent by weight was subjected to renewed centrifugation up to a fat content of 55 percent, whereby a water based low fat fraction was obtained. This low fat fraction was used to dilute cream having a fat content of 35 percent down to a fat content of 28 percent.

This diluted cream was subjected to flash sterilisation and packed in sterile packages. The packages has a storage life of at least six weeks as determined by accelerated storage tests (37° C. at 90% humidity).

One sample was subjected to pressure homogenisation at a pressure of 30 kg./cm.$^2$ and a temperature of 80° whereupon it was whipped. Whipping time was 3½ minutes overrun was 150, and serum formation was 0, 2, 4 and 6 after 1, 2, 3 and 4 hours, respectively.

Another sample was not homogenised. In this case the whipping time was 3 minutes and serum formation 0.5, 2, 3.5 and 5 after 1, 2, 3 and 4 hours, respectively.

The whipped cream prepared from both samples was considerably whiter than whipped cream prepared from a cream containing 35% fat and subjected to the same heat treatment. The latter whipping cream had a taste which differed somewhat from the taste of fresh cream, whereas no change in taste could be detected in the cream containing 28 percent fat before and after the heat treatment.

Example 3

10 litres commercially available whipping cream containing 35% fat was admixed with 4 litres of a recombined sweet buttermilk prepared by dissolving dried buttermilk powder in the proper amount of water. The cream thus obtained contained 25 percent fat. This cream was subjected to homogenisation at pressure varying from 10 up to 180 kg./cm.$^2$ The cream was filled into cans which were closed and sealed and preheated to about 100° C. Thereupon the cans were sterilised at 117° C. in 15 minutes. Samples were examined after 4 hours and after 20 hours.

In all cases the whipping cream had a pleasing appearance and did not differ much in whiteness from the colour of unsterilised cream. All samples were easily whippable. The whipped cream had no unpleasant taste. Unwhipped, the taste of the sterilised cream differed somewhat from the taste of unsterilised, fresh cream, but this difference was not unpleasant and disappeared, as mentioned, after whipping.

Example 4

1 litre commercially available whipping cream having a fat content of 35 percent was admixed with 1 litre neutralised acid buttermilk and 50 grams sodium caseinate. This mixture was subjected to the same sterilisation treatment as in Example 3 and was thereupon stored for two months at 37° C. Bacteria count was nil after this storage. This cream was not whippable to ordinary cream but was an excellent coffee cream having good whiting properties and a pleasant taste. No taste of "boiled" milk could be detected after storage.

Example 5

A cream containing 20 percent by weight of fat was prepared by mixing together 7.8 litres commercially available whipping cream (35% fat). 1.2 litres acid buttermilk and 4.8 litres sweet buttermilk. To this mixture was added 1% of dried sweet buttermilk powder to increase the content of dry matter to 26.86 by weight. pH was 6.3. The viscosity of this cream was somewhat low, but the taste was pleasant. This whipping cream was heated to 96° C. in an open vessel while subjected to homogenisation with a batch homogeniser and then cooled. After heating no change in taste could be observed. The cream was easily whippable with an overrun of 150. Serum formation was low. The consistence of this whipped cream was excellent.

Bacteria count was nil and the cream could be stored for at least four weeks in closed containers at room temperature without any significant change in taste.

I claim:

1. A whippable sterilised cream consisting essentially of butterfat in an amount of between 18 to 28 percent by weight of said sterilized cream; and
a low fat milk fraction of pure milk constituents containing buttermilk in an amount effective to prevent boiled taste.

2. A process of producing sterilised cream free of a boiled taste comprising the steps of
separating a first cream having a fat content of at least 10 percent by weight into a high fat fraction of greater fat content and a low fat fraction of less fat content;
adding the low fat fraction to a second cream in an amount effective to prevent boiled taste and to decrease the fat content of said second cream, thereby forming a third cream of less fat content than said second cream and of a fat content between 18 and 28 percent by weight; and
subsequently sterilising said third cream.

3. A process as set forth in claim 2 wherein said step of separating includes the centrifugation of said first cream to divide said first cream into said fractions.

4. A process for producing sterilised cream comprising the steps of decreasing the fat content of milk cream to a value between 18 and 28 percent by weight by adding buttermilk thereto in an amount sufficient to prevent boiled taste and to reduce the fat content to said value and of subsequently sterilising the resulting cream of decreased fat content.

5. The process according to claim 4 wherein the buttermilk used is sweet buttermilk.

6. The process according to claim 4 wherein the buttermilk used is a mixture of sweet buttermilk and acid buttermilk.

7. A process for producing sterilised liquid milk products having a fat content of a value between 18 and 28 percent by weight selected from the group consisting of milk and cream free of a boiled taste comprising the steps of obtaining a low fat milk fraction from the separation of milk cream, which milk cream contains at least 10 percent by weight of butterfat, into a fat enriched fraction of higher butterfat content and a low fat milk fraction;

adding the low fat milk fraction to said liquid milk product in an amount sufficient to reduce the fat content to said valve and to prevent boiled taste; and subsequently sterilising the mixture of the low fat milk fraction and said liquid milk product.

References Cited
UNITED STATES PATENTS 3,126,283    3/1964    Noznick et al.     99—63 X

FOREIGN PATENTS 1,378,383    11/1963    France.

A. LOUIS MONACELL, Primary Examiner

D. M. NAFF, Assistant Examiner

U.S. Cl. X.R.

99—60